United States Patent
Ishida

(10) Patent No.: US 10,124,781 B2
(45) Date of Patent: Nov. 13, 2018

(54) VEHICLE BRAKE DEVICE

(71) Applicant: ADVICS CO., LTD., Kariya-shi, Aichi-ken (JP)

(72) Inventor: Yasuhito Ishida, Toyokawa (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 0 days.

(21) Appl. No.: 15/312,074

(22) PCT Filed: Jun. 29, 2015

(86) PCT No.: PCT/JP2015/068611
§ 371 (c)(1),
(2) Date: Nov. 17, 2016

(87) PCT Pub. No.: WO2016/002685
PCT Pub. Date: Jan. 7, 2016

(65) Prior Publication Data
US 2017/0101082 A1    Apr. 13, 2017

(30) Foreign Application Priority Data

Jun. 30, 2014   (JP) .................................. 2014-135365

(51) Int. Cl.
*B60T 8/58*    (2006.01)
*B60T 7/12*    (2006.01)
(Continued)

(52) U.S. Cl.
CPC    *B60T 8/58* (2013.01); *B60T 1/10* (2013.01); *B60T 7/042* (2013.01); *B60T 7/12* (2013.01);
(Continued)

(58) Field of Classification Search
None
See application file for complete search history.

(56) References Cited

U.S. PATENT DOCUMENTS

| | | | |
|---|---|---|---|
| 2011/0066342 A1* | 3/2011 | Ozaki | B60T 7/042 701/70 |
| 2015/0203117 A1* | 7/2015 | Kelly | B60K 31/02 701/91 |

FOREIGN PATENT DOCUMENTS

| | | |
|---|---|---|
| JP | 2007-030581 A | 2/2007 |
| JP | 2010-105496 A | 5/2010 |
| JP | 2011-255792 A | 12/2011 |

OTHER PUBLICATIONS

International Search Report (PCT/ISA/210) dated Sep. 8, 2015, by the Japanese Patent Office as the International Searching Authority for International Application No. PCT/JP2015/068611.
(Continued)

*Primary Examiner* — Mussa A Shaawat
*Assistant Examiner* — Abdhesh K Jha
(74) *Attorney, Agent, or Firm* — Buchanan Ingersoll & Rooney PC

(57) ABSTRACT

A vehicle brake device is provided with: an acquisition unit that acquires travel resistance force produced between a vehicle wheel and a road surface touched by the wheel when, for example, a vehicle having the wheel travels, on the basis of driving force of the vehicle and acceleration of the vehicle; and a control unit that starts a control for supplying braking force to the wheel of the vehicle when a difference between the travel resistance force and a predetermined value exceeds a first threshold value and a differential value of the travel resistance force exceeds a second threshold value.

8 Claims, 11 Drawing Sheets

(51) Int. Cl.
*B60T 1/10* (2006.01)
*B60T 7/04* (2006.01)
*B60T 8/175* (2006.01)
*B60T 11/18* (2006.01)
*B60W 40/107* (2012.01)
*B60W 10/04* (2006.01)
*B60W 40/068* (2012.01)
*B60W 10/18* (2012.01)
*B60W 30/02* (2012.01)

(52) U.S. Cl.
CPC ............... *B60T 8/175* (2013.01); *B60T 11/18* (2013.01); *B60W 10/04* (2013.01); *B60W 10/18* (2013.01); *B60W 30/02* (2013.01); *B60W 40/068* (2013.01); *B60W 40/107* (2013.01); *B60T 2210/124* (2013.01); *B60T 2210/16* (2013.01); *B60T 2220/04* (2013.01); *B60T 2250/04* (2013.01)

(56) References Cited

OTHER PUBLICATIONS

Written Opinion (PCT/ISA/237) dated Sep. 8, 2015, by the Japanese Patent Office as the International Searching Authority for International Application No. PCT/JP2015/068611.

\* cited by examiner

[FIG.1A]
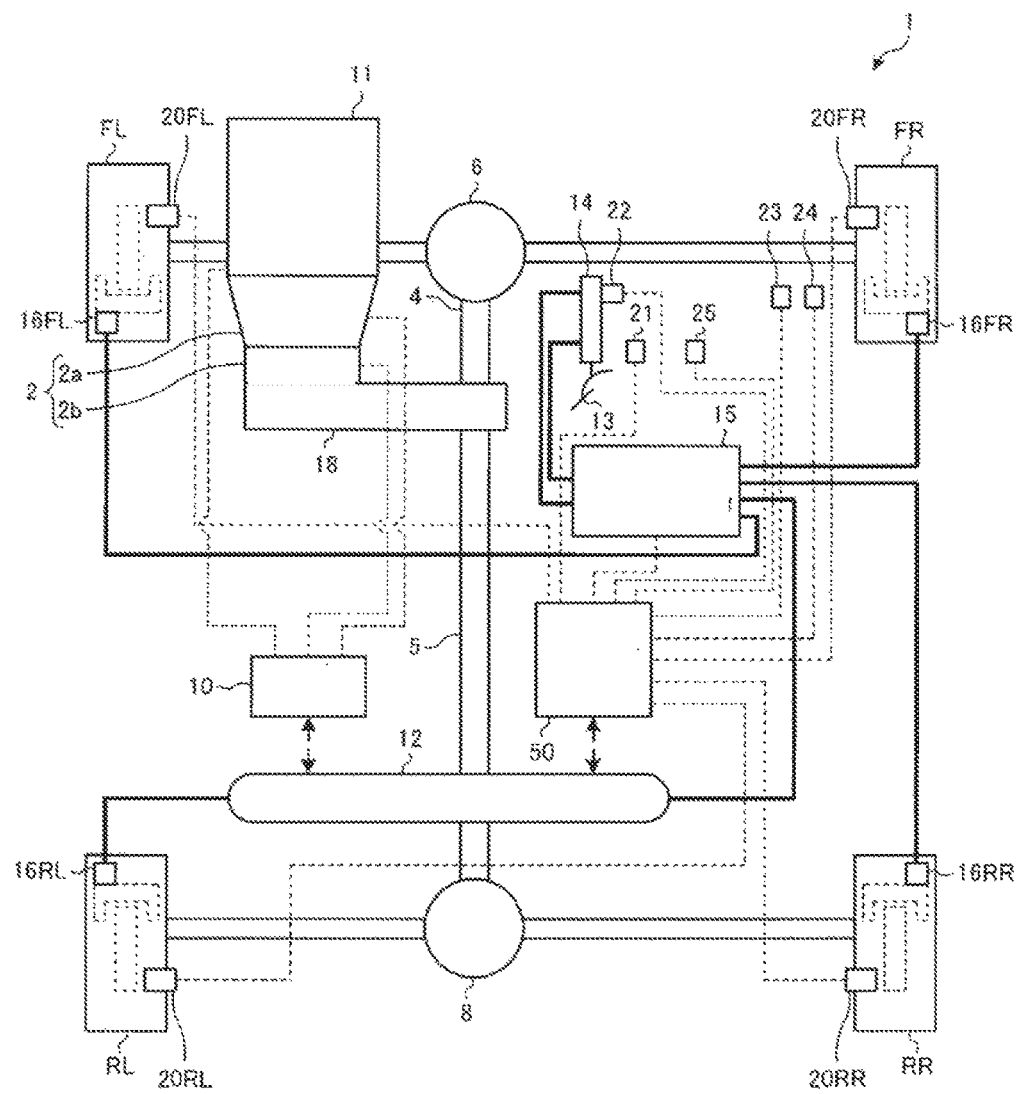

[FIG.1B]

2a  MAIN TRANSMISSION

2b  SUB-TRANSMISSION

6   FRONT DIFFERENTIAL GEAR

8   REAR DIFFERENTIAL GEAR

10  ENGINE ECU

11  ENGINE

12  LAN

15  BRAKE ACTUATOR

50  BRAKE ECU

[FIG.2A]
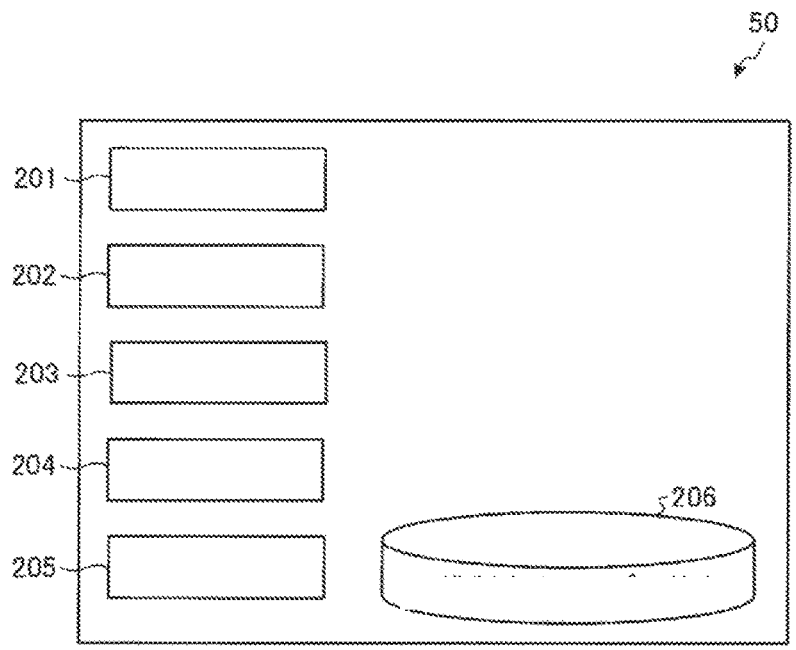
[FIG.2B]
| | |
|---|---|
| 201 | COMMUNICATION UNIT |
| 202 | INPUTTING PROCESS UNIT |
| 203 | ACQUISITION UNIT |
| 204 | DETERMINATION UNIT |
| 205 | CONTROL UNIT |
| 206 | PRELIMINARY CONTROL FORCE MAP STORAGE UNIT |
[FIG.3]
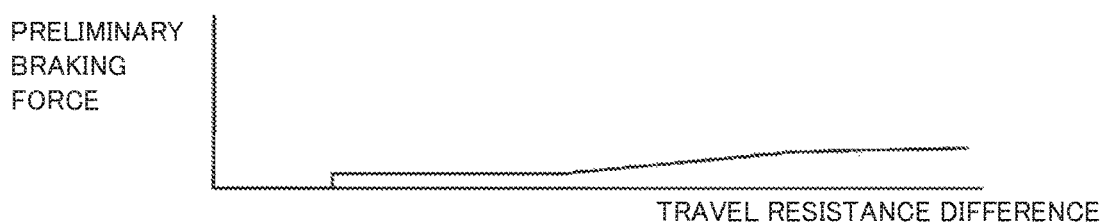

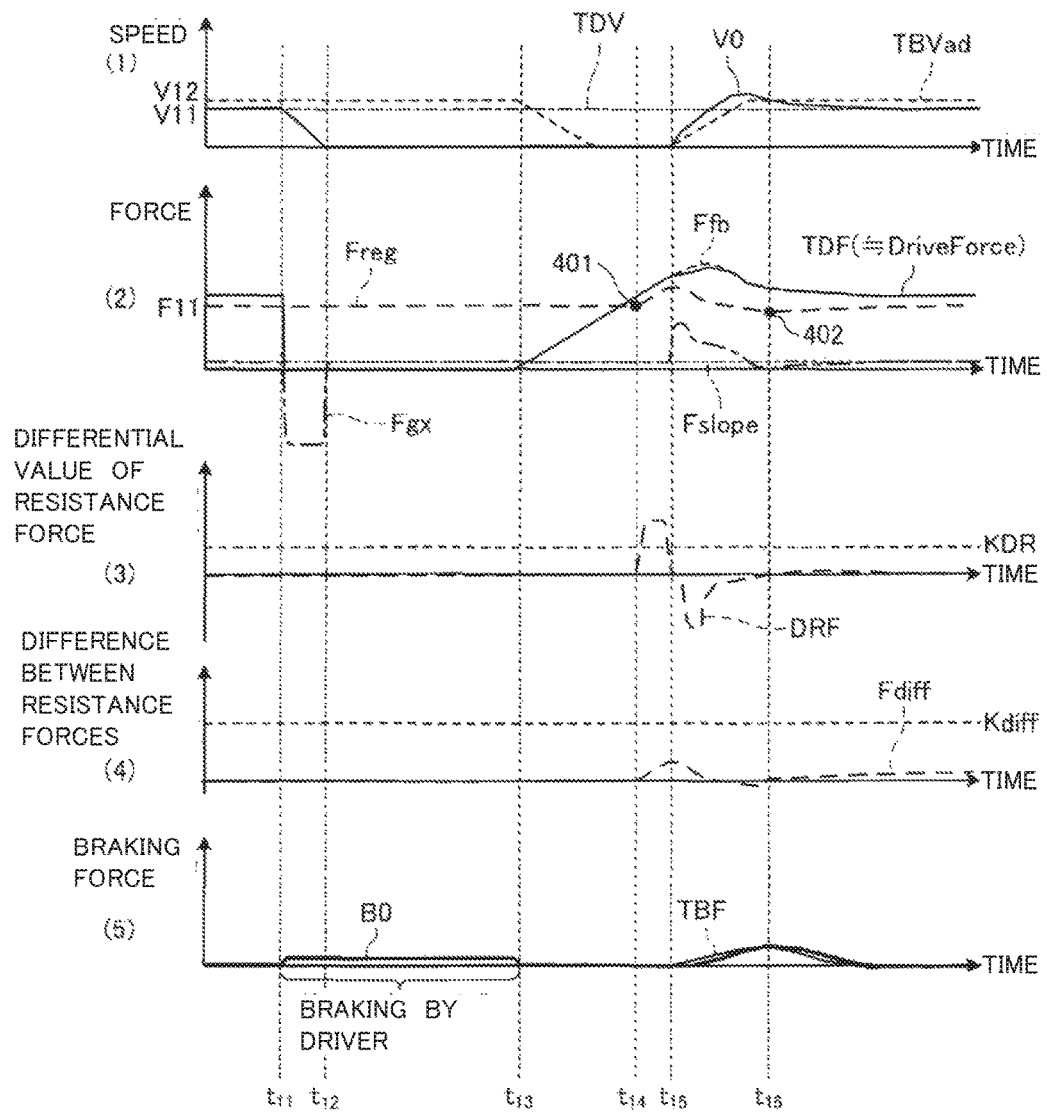

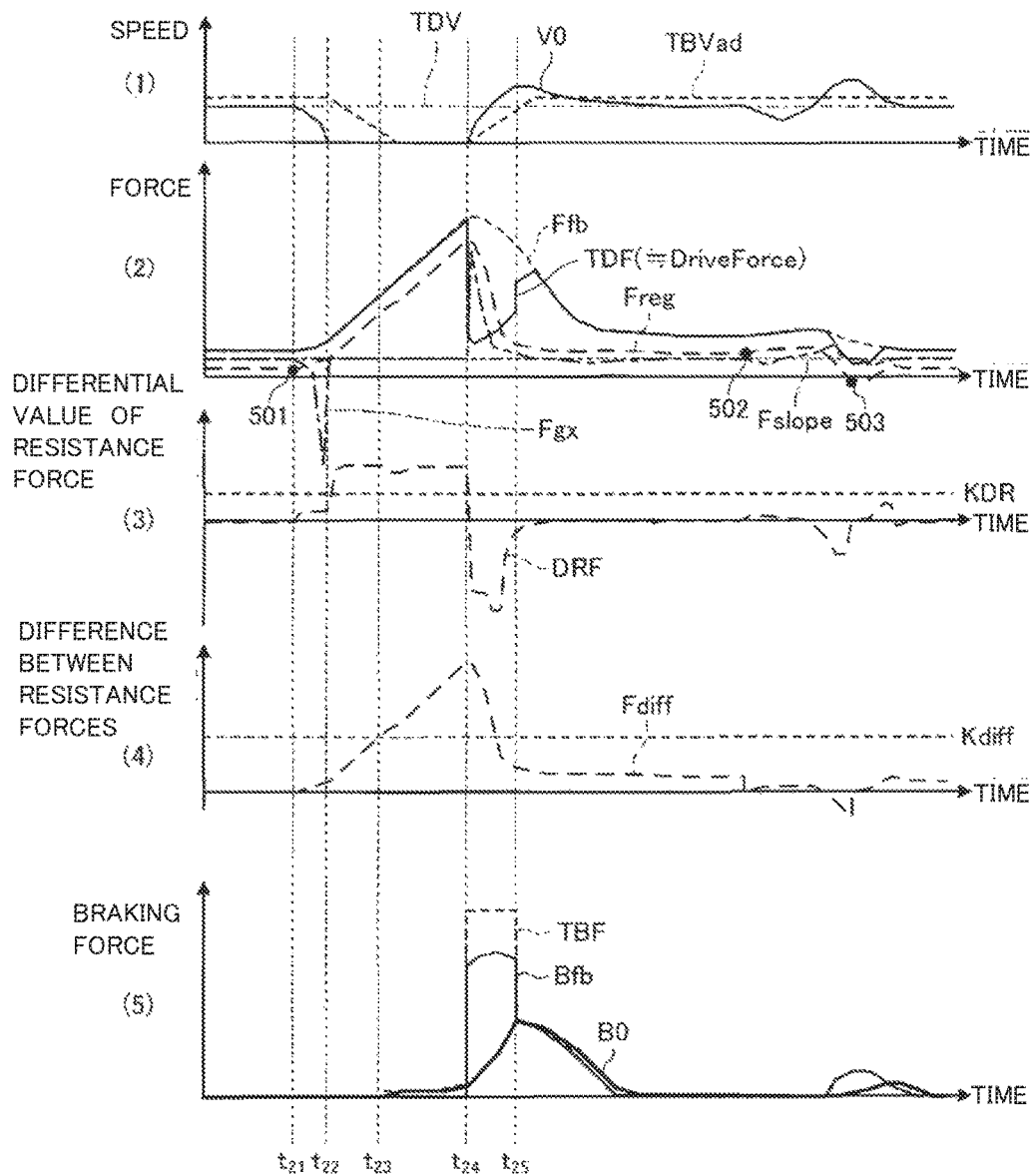
[FIG.5]

[FIG.6A]
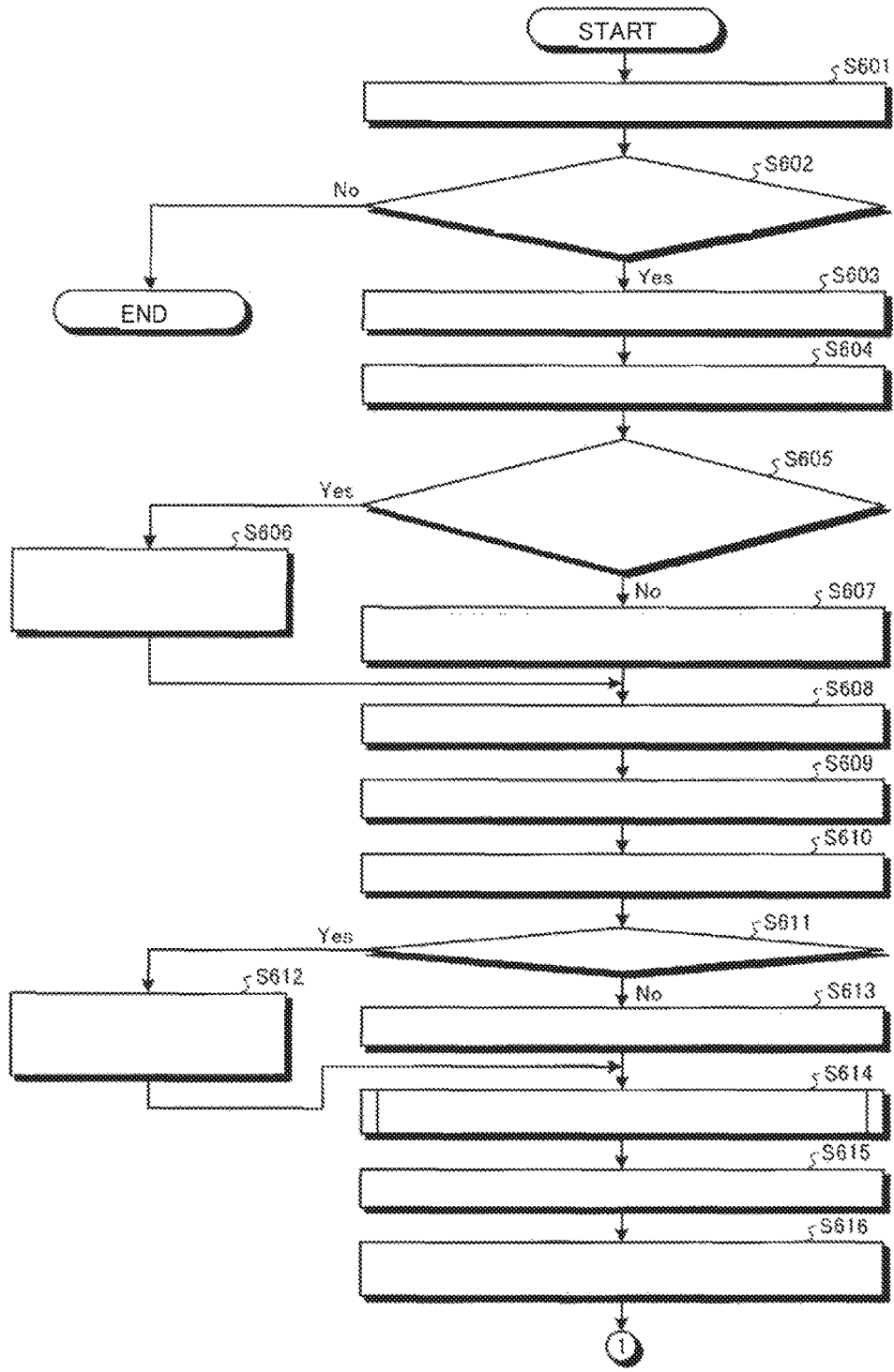

[FIG.6B]

S601 ACQUIRE VARIOUS PARAMETERS FROM SENSOR OR THE LIKE

S602 POSITION OF SUB-TRANSMISSION GEAR = L4, AND CRAWL SWITCH = ON?

S603 CALCULATE VEHICLE BODY SPEED AND VEHICLE BODY ACCELERATION

S604 CALCULATE TARGET SPEED FOR DRIVING AND TARGET ACCELERATION FOR DRIVING

S605 VEHICLE BODY SPEED = 0, PREVIOUS FEEDBACK BRAKING FORCE = 0, BRAKE CONTROL BY USER = OFF?

S606 BRAKING REFERENCE SPEED = MAX (PREVIOUS BRAKING REFERENCE SPEED − Kdw, 0).

S607 BRAKING REFERENCE SPEED = MIN (PREVIOUS BRAKING REFERENCE SPEED + Kup, TBVmax)

S608 CALCULATE BRAKING REFERENCE ACCELERATION

S609 CALCULATE INCLINATION AND INCLINATION FORCE

S610 CALCULATE DRIVING FORCE, BRAKING FORCE, AND ACTUAL ACCELERATION

S611 VEHICLE BODY SPEED = 0?

S612 TRAVEL RESISTANCE FORCE = MAX ((DRIVING FORCE − ACTUAL ACCELERATION − BRAKING FORCE), PREVIOUS TRAVEL RESISTANCE FORCE)

S613 TRAVEL RESISTANCE FORCE = MAX ((DRIVING FORCE − ACTUAL ACCELERATION − BRAKING FORCE), 0)

S614 SETTING PROCESS OF REFERENCE VALUE OF TRAVEL RESISTANCE FORCE

S615 CALCULATE DIFFERENTIAL VALUE OF TRAVEL RESISTANCE FORCE

S616 CALCULATE TRAVEL RESISTANCE DIFFERENCE SERVING AS DIFFERENCE BETWEEN TRAVEL RESISTANCE FORCE AND REFERENCE VALUE

[FIG.7A]
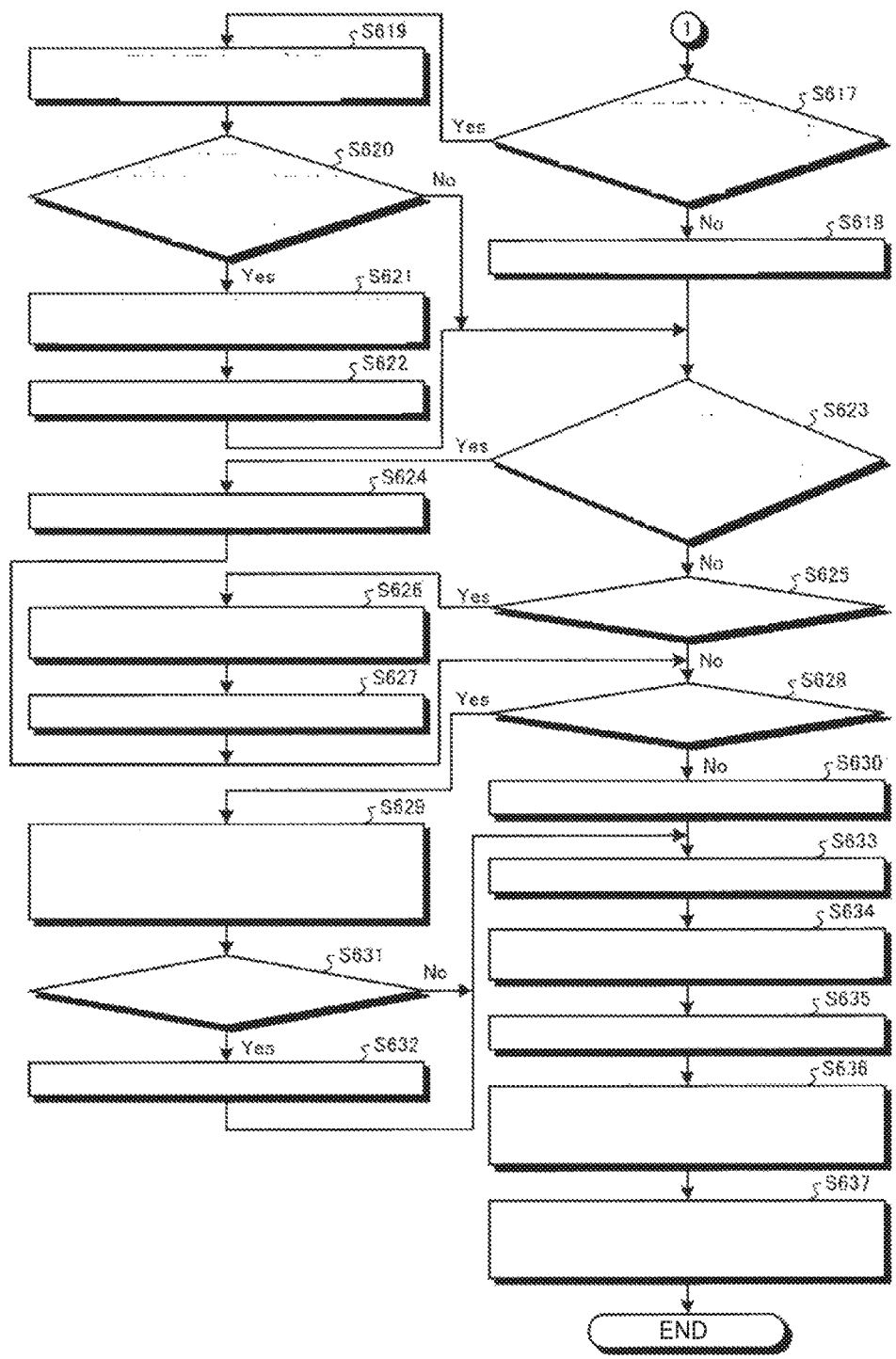

[FIG.7B]

S617 (DIFFERENTIAL VALUE OF TRAVEL RESISTANCE FORCE > THRESHOLD VALUE FOR DIFFERENTIAL), AND (TRAVEL RESISTANCE DIFFERENCE > THRESHOLD VALUE FOR DIFFERENCE)?

S618 PRELIMINARY BRAKING FORCE = 0

S619 CALCULATE PRELIMINARY BRAKING FORCE FROM PRELIMINARY BRAKING FORCE MAP

S620 PREVIOUS VEHICLE BODY SPEED BRAKING REFERENCE SPEED AND CURRENT VEHICLE BODY SPEED > BRAKING REFERENCE SPEED?

S621 FEEDBACK BRAKING FORCE = MAX (TRAVEL RESISTANCE DIFFERENCE, PREVIOUS FEEDBACK BRAKING FORCE)

S622 FIRST FLAG = ON, SECOND FLAG = ON

S623 FIRST FLAG = ON, BRAKING FORCE < FEEDBACK BRAKING FORCE, VEHICLE BODY ACCELERATION > BRAKING REFERENCE ACCELERATION?

S624 PRELIMINARY BRAKING FORCE = SETTABLE MAXIMUM VALUE

S625 FIRST FLAG = ON?

S626 CURRENT FEEDBACK BRAKING FORCE = MIN (PREVIOUS FEEDBACK BRAKING FORCE, VEHICLE BODY BRAKING FORCE)

S627 FIRST FLAG = OFF

S628 SECOND FLAG = ON?

S629 FIRST ADJUSTMENT DRIVING FORCE = MAX (MIN ((DRIVING FORCE − INCLINATION FORCE), (VEHICLE BODY ACCELERATION − BRAKING REFERENCE ACCELERATION) × VEHICLE BODY WEIGHT), PREVIOUS FIRST ADJUSTMENT DRIVING FORCE − Kdw2, 0)

S630 FIRST ADJUSTMENT DRIVING FORCE = 0

S631 FIRST ADJUSTMENT DRIVING FORCE = 0?

[FIG.7C]

S632  SECOND FLAG = OFF?

S633  CALCULATE FEEDBACK BRAKING FORCE

S634  TARGET BRAKING FORCE = MAX (FEEDBACK BRAKING FORCE, PRELIMINARY BRAKING FORCE)

S635  CALCULATE FEEDBACK DRIVING FORCE

S636  SECOND ADJUSTMENT DRIVING FORCE = MAX (MIN (FEEDBACK BRAKING FORCE − VEHICLE BODY BRAKING FORCE), (FEEDBACK DRIVING FORCE − INCLINATION FORCE), 0)

S637  TARGET DRIVING FORCE = FEEDBACK DRIVING FORCE − MAX (FIRST ADJUSTMENT DRIVING FORCE, SECOND ADJUSTMENT DRIVING FORCE)

[FIG.8A]
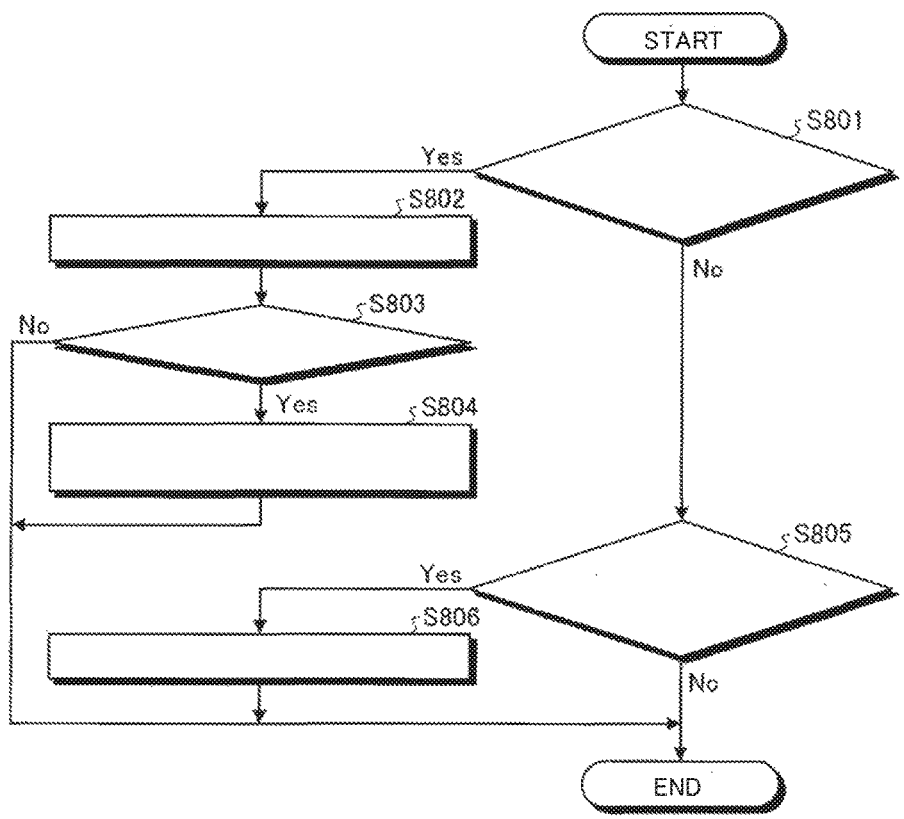
[FIG.8B]
S801   CURRENT TRAVEL RESISTANCE FORCE > PREVIOUS TRAVEL RESISTANCE FORCE?
S802   ADD 1 TO COUNTER
S803   COUNTER = 1?
S804   REFERENCE VALUE OF TRAVEL RESISTANCE = PREVIOUS TRAVAL RESISTANCE FORCE
S805   CURRENT TRAVEL RESISTANCE FORCE < PREVIOUS TRAVEL RESISTANCE FORCE?
S806   COUNTER IS INITIALIZED TO 0

VEHICLE BRAKE DEVICE

TECHNICAL FIELD

The present invention relates to a vehicle brake device.

BACKGROUND ART

A technique to improve the safety and utility of a vehicle in off-road traveling has been proposed. For example, as the technique, a crawl control (Crawl Control) technique is given. The crawl control is a technique to support a driving operation of a driver on a road surface such as a rockbound road, a snowy road, or a steep slope which requires a driver to execute fine speed control.

In the crawl control, the driver optimally controls the engine and the brake to cause the vehicle to travel at a low speed (for example, 1 to 5 km/h) set by the driver to make it possible to minimize slipping of the wheels.

In off-road driving, high driving force is required to cause the vehicle to run over a step formed of an obstacle or the like. However, a situation in which, after the vehicle runs over the step by outputting high driving force, the vehicle excessively accelerates to give a jumping-out feeling to the driver occurs. For this reason, there is a technique which, in order to improve braking response after the vehicle runs on the step, when it is determined that the vehicle runs on the step, actuates (gives preliminary braking force) a braking means not enough to substantially give braking force.

CITATIONS LIST

Patent Literature

Patent Literature 1: Japanese Unexamined Patent Publication No. 2007-30581

SUMMARY OF INVENTION

Technical Problems

However, in a conventional technique, when a speed depending on a torque is not detected, it is determined that a step is present. However, a situation in which a speed depending on a change in amount of torque is not detected may be another situation in which a vehicle travels on not only a step but also a road surface such as a desert which has a high travel resistance force. In this manner, when a preliminary braking force is given on a place except for a step, a gas mileage may decrease. Furthermore, Patent Literature 1 also is not a technique related to automatic speed control (crawl control) at a low speed.

The present invention has been made in consideration of the above circumstances, and proposes a vehicle brake device which achieves speed control of a vehicle depending on road surfaces.

Solutions to Problems

A vehicle brake device is provided with: an acquisition unit that acquires travel resistance force produced between a vehicle wheel and a road surface touched by the wheel when, for example, a vehicle having the wheel travels, on the basis of driving force of the vehicle and acceleration of the vehicle; and a control unit that starts a control for supplying braking force to the wheel of the vehicle when a difference between the travel resistance force and a predetermined value exceeds a first threshold value and a differential value of the travel resistance force exceeds a second threshold value.

In the vehicle brake device, for example, the acquisition unit further acquires a speed of the vehicle, the control unit further supplies braking force to the wheel when the speed of the vehicle exceeds a first speed after the control unit starts control for supplying braking force to the wheel.

In the vehicle brake device, for example, furthermore, when the speed of the vehicle exceeds the first speed after the control unit starts control for supplying braking force to the wheel, the control unit designates an actuator for supplying braking force to the wheel to supply maximum settable braking force to the wheel.

In the vehicle brake device, for example, furthermore, when the speed of the vehicle exceeds the first speed, the control unit reduces the driving force of the vehicle by a larger value of an amount of adjustment based on a difference between a braking force calculated depending on the speed and acceleration of the vehicle and an actually output braking force and an amount of adjustment based on the acceleration of the vehicle.

In the vehicle brake device, for example, furthermore, the control unit sets a minimum value of the travel resistance force acquired by the acquisition unit in an arbitrary period of time as the reference value.

In the vehicle brake device, for example, furthermore, the control unit performs control for reducing the first speed serving as a reference for supplying braking force when the vehicle stops and the driver does not perform braking control of the vehicle.

BRIEF DESCRIPTION OF DRAWINGS

FIGS. 1A and 1B are a block diagram showing an entire configuration of a vehicle according to an embodiment.

FIGS. 2A and 2B are a block diagram showing a configuration produced according to a control program executed by a brake ECU according to the embodiment.

FIG. 3 is a graph illustrating a preliminary braking force map stored in a preliminary braking force map storage unit according to the embodiment.

FIGS. 4(1) to 4(5) are graphs illustrating timings of control performed while the vehicle according to the embodiment travels.

FIGS. 5(1) to 5(5) are graphs illustrating timings of control performed while the vehicle according to the embodiment travels.

FIGS. 6A and 6B are a flow chart showing a procedure of braking control in the vehicle according to the embodiment.

FIGS. 7A-7C are a flow chart showing a procedure of braking control in the vehicle according to the embodiment.

FIGS. 8A and 8B a flow chart showing a procedure of a setting process of a reference value of travel resistance force in the vehicle according to the embodiment.

DESCRIPTION OF EMBODIMENTS

The embodiment (will be described below) explains an example in which a vehicle brake device is applied to a brake ECU. However, in the embodiment (will be described below), a target to which the vehicle brake device is applied is not limited to the brake ECU, and may be a device which supplies braking force to a wheel.

FIGS. 1A and 1B are a block diagram showing an entire configuration of a vehicle according to the embodiment. As shown in FIGS. 1A and 1B, the embodiment explains an example in which a vehicle 1 is a so-called four-wheel-drive vehicle in which all a plurality of (four in the embodiment) wheels (left-front wheel FL, right-front wheel FR, left-rear wheel RL, and right-rear wheel RR) function as drive wheels. However, the vehicle 1 is not limited to a four-wheel-drive vehicle, and the invention can be applied to various vehicles.

The vehicle 1 according to the embodiment includes an engine 11 which generates driving force under the control of an engine ECU 10. Furthermore, the vehicle 1 includes a main transmission 2a connected to an output shaft of the engine 11 and a sub-transmission 2b disposed on the downstream side (i.e., wheel side) of the main transmission 2a on a torque transmitting path. A range (gear positions) of the sub-transmission 2b makes it possible to switch the gear position to gear positions having different transmitting ratios of torque to the wheel FR, FL, RR, and RL sides by an operation (of an accelerator pedal or the like not shown) performed by a driver or under the control of the engine ECU 10. In the embodiment, a transmission 2 is configured by a combination of the main transmission 2a and the sub-transmission 2b. However, any configuration may be used.

A center differential 18 is disposed on the downstream side of the sub-transmission 2b on the transmitting path. Torques generated by the engine 11 are transmitted as driving force to the front-wheel FR and FL sides and the rear-wheel RR and RL sides through the center differential 18, respectively. On the front-wheel FR and FL sides of the center differential 18, a front differential 6 is disposed. The front differential 6 transmits driving forces transmitted from the center differential 18 through a front-wheel-side shaft 4 to the front wheels FR and FL, respectively.

On the rear-wheel RR and RL sides of the center differential 18, a rear differential 8 is disposed. The rear differential 8 transmits driving forces transmitted from the center differential 18 through a rear-wheel-side shaft 5 to the rear wheels RL and RR, respectively. The torque generated by the engine 11 is transmitted to each of the wheels FR, FL, RR, and RL to rotate each of the wheels FR, FL, RR, and RL so as to cause the vehicle 1 to travel.

The engine ECU 10 has a CPU, a ROM, a RAM, and the like (not shown). The engine ECU 10 receives an amount of manipulation of the accelerator by the driver from an accelerator manipulation amount sensor (not shown). The engine ECU 10 controls the engine 11 based on an accelerator manipulation amount or the like.

In the vehicle 1, there are provided a master cylinder (also called an M/C) 14 generating a brake fluid pressure depending on an operation status of a brake pedal 13 by the driver and an M/C pressure sensor 22 detecting a brake pressure generated in the M/C 14.

A brake actuator 15 supplies braking forces depending on brake pressures to the wheels FR, FL, RR, and RL, respectively. More specifically, the brake actuator 15, depending on a brake pressure, performs control for supplying brake fluid to wheel cylinders (also called W/C) 16FL, 16FR, 16RL, and 16RR disposed for the wheels FR, FL, RR, and RL, respectively. Friction between a brake pad and a disk generated by the control supplies braking force to each of the wheels FR, FL, RR, and RL. The brake actuator 15 can independently adjust braking forces to the wheels FR, FL, RR, and RL.

The brake actuator 15, regardless of whether the driver operates the brake pedal 13, under the control of a brake ECU 50, can supply braking forces to the wheels FR, FL, RR, and RL.

The brake ECU 50 which can control the brake actuator 15 will be described below. In addition to a brake switch 21, wheel speed sensors 20FL, 20FR, 20RL, and 20RR to detect wheel speeds of the wheels FR, FL, RR, and RL are electrically connected to the brake ECU 50. The brake ECU 50 is also connected to the M/C pressure sensor 22 to detect an amount of manipulation of the brake pedal 13 by the driver. An acceleration sensor 25 to detect a forward/backward acceleration of the vehicle 1, a horizontal acceleration of the vehicle 1, and a yaw acceleration of the vehicle 1 is electrically connected to the brake ECU 50.

The forward/backward acceleration detected by the acceleration sensor 25 is a positive value when the vehicle 1 accelerates in a forward/backward direction while the vehicle 1 travels on a horizontal road surface, and a negative value when the vehicle 1 decelerates in a forward/backward direction.

The brake ECU 50 includes a digital computer constituted by a CPU, a ROM, a RAM, and the like. In the ROM, a control program executed by the CPU, various maps, and the like are stored. In the RAM, various pieces of information (vehicle body speed) which are arbitrarily rewritten and the like are stored.

A CRAWL switch 23, a target speed setting switch 24, and a brake switch 21 are electrically connected to the brake ECU 50 according to the embodiment. The brake ECU 50 controls the brake actuator 15 according to signals transmitted from the CRAWL switch 23 and the target speed setting switch 24.

For example, the brake ECU 50 performs speed regulation control such as crawl control according to an operation performed with the CRAWL switch 23. At this time, the brake ECU 50 performs the speed regulation control such that the vehicle body speed of the vehicle 1 becomes a speed set with the target speed setting switch 24. For example, the brake ECU 50 sets a larger value as a target braking force when an actual speed is higher than the speed set with the target speed setting switch 24 based on the vehicle body speed of the vehicle 1. The brake ECU 50 controls the brake actuator 15 such that braking forces depending on the target braking force are supplied to the wheels FR, FL, RR, and RL.

In the embodiment, the engine ECU 10 and the brake ECU 50 are connected to each other through a LAN 12. In this manner, information can be exchanged between the engine ECU 10 and the brake ECU 50. For example, in speed control of the vehicle 1 according to crawl control, driving force control by the engine ECU 10 and braking force control by the brake ECU 50 can be cooperated with each other.

For example, in the crawl control, in driving at a low speed set by the driver, pieces of information related to a speed, a driving force, and a braking force are exchanged between the engine ECU 10 and the brake ECU 50 to make it possible to achieve fine speed adjustment.

As in a conventional technique, when a speed corresponding to a torque is not output, even in the case of no step, the braking control has been performed similarly to the case where a step is present. However, the braking control is not preferable in terms of a gas mileage and the like. The embodiment achieves braking control depending on a road surface condition. In the embodiment, it is assumed that a road surface condition is recognized depending on travel resistance force to perform braking control according to the condition.

FIGS. 2A and 2B are a block diagram showing a configuration produced according to a control program executed by a CPU (not shown) of the brake ECU 50. As shown in FIGS. 2A and 2B, the brake ECU 50 executes the control program to achieve a communication unit 201, an inputting process unit 202, an acquisition unit 203, a determination unit 204, and a control unit 205. A preliminary braking force map storage unit 206 is stored in a ROM (not shown) in the brake ECU 50.

The communication unit 201 exchanges information with the engine ECU 10 through the LAN 12. For example, the communication unit 201 receives information representing driving force output from the engine 11 from the engine ECU 10. The communication unit 201 transmits a request to control the engine 11 to the engine ECU 10.

The inputting process unit 202 performs an inputting process of various pieces of information related to the vehicle 1. As the pieces of information to be input, for example, a signal representing an operation status of the CRAWL switch 23, a speed set with the target speed setting switch 24, wheel speeds obtained by the wheel speed sensors 20FL, 20FR, 20RL, and 20RR, and an acceleration obtained by the acceleration sensor 25 are subjected to an inputting process.

Furthermore, the inputting process unit 202 also performs calculations or the like required for the acquisition unit 203 and the determination unit 204 on the basis of the pieces of information to which the inputting process is performed.

The acquisition unit 203 acquires, when the vehicle 1 having wheels travels, on the basis of the driving force of the vehicle 1 and the acceleration of the vehicle 1, travel resistance forces produced between the wheels FL, FR, RL, and RR of the vehicle 1 and a road surface touched by the wheels FL, FR, RL, and RR. The travel resistance forces according to the embodiment are defined as resistance forces generated by frictions between the wheels FL, FR, RL, and RR of the vehicle 1 and the road surface. Although a method of calculating the travel resistance force will be described later, the method is not limited to the method (will be described later), and any method may be used.

The determination unit 204 determines, on the basis of the travel resistance force and a change in travel resistance force (per unit time), whether a step is present. In the embodiment, it is assumed that step determination is performed in consideration of not only a magnitude of travel resistance force but also a change in travel resistance force. More specifically, when the wheels FR, FL, RR, and RL of the vehicle 1 touch a step on a road surface, the step allows the travel resistance force to sharply change. The sharp change in travel resistance force does not occur on a road surface in the desert or the like. For this reason, in the embodiment, in addition to the travel resistance force, the change in travel resistance force is considered to make it possible to improve step detection accuracy.

The determination unit 204 according to the embodiment sets a travel resistance force acquired by the acquisition unit 203 at certain time as a reference value and determines that a step is present on a road surface when a difference between a travel resistance force acquired after the certain time and the reference value exceeds a threshold value for the difference and when a differential value (change per unit time) of the travel resistance force exceeds a threshold value for the differential.

The control unit 205 controls the brake actuator 15 to supply braking force to the vehicle 1. The control unit 205 according to the embodiment, in order to cause a vehicle body speed to be close to a target speed, on the basis of a deviation between the vehicle body speed and the target speed in every predetermined control cycle, calculates a feedback braking force and/or a feedback driving force to supply the braking force and/or the driving force to the wheels FR, FL, RR, and RL.

For example, when the determination unit 204 determines that a step is present on a road surface, the control unit 205 starts control for the brake actuator 15 to supply braking force to the vehicle 1. At this time, preliminary braking control to actuate the brake actuator 15 is executed. More specifically, in a state in which any braking force is not supplied, a time is required until actual braking force is supplied after the brake ECU 50 designates to supply braking forces to the wheels FR, FL, RR, and RL. In the embodiment, a braking force which is not enough to substantially supply braking force, in other words, not enough to cause a hindrance to travel at a speed set in crawl control which is control for supplying braking forces to the wheels of the vehicle 1 is defined as a preliminary driving force. When the determination unit 204 determines that a step is present, the control unit 205 starts the supply of the preliminary braking force. After the preliminary braking force is supplied as described above, after the vehicle runs on the step, the brake ECU 50 can sharply supply substantial braking force to the vehicle 1 without giving a jumping-out feeling of the vehicle 1 to the driver.

The control unit 205 according to the embodiment determines a preliminary braking force to be supplied by actuating the brake actuator 15 with reference to the preliminary braking force map storage unit 206. FIG. 3 is a diagram illustrating the preliminary braking force map stored in the preliminary braking force map storage unit 206. A travel resistance difference shown in the example shown in FIG. 3 is defined as a difference between a current travel resistance force and a reference value of travel resistance force. On the basis of the travel resistance difference, a preliminary braking force is determined. As shown in FIG. 3, when the travel resistance difference increases (the current travel resistance force is larger than the reference value), the preliminary braking force is set to increase.

The control unit 205 actuates the brake actuator 15 such that determined preliminary braking forces (not enough to substantially supply braking force) are generated on the wheels FR, FL, RR, and RL.

Control performed while the vehicle 1 travels will be described below. FIGS. 4(1) to 4(5) are graphs illustrating timings of control performed while the vehicle 1 travels. In the examples shown in FIGS. 4(1) to 4(5), it is assumed that crawl control has been executed. In FIG. 4(1), a target speed TDV of the crawl control is shown.

In FIG. 4(1), the target speed is expressed as a vehicle body speed V0 of the vehicle 1. On the other hand, FIG. 4(5) shows a braking force B0 applied to each of the wheels FL, FR, RL, and RR of the vehicle 1. As shown by the braking force B0 denoted by (5), for a period from time t11 to time t13, the driver works the brake pedal 13. In this manner, as indicated by (1), for a period from time t11 to time t12, the vehicle body speed V0 of the vehicle 1 decreases from a speed V11 to speed "0".

Note that FIG. 4(1) shows a braking-reference speed TBVad serving as a reference used to start the supply of braking force in crawl control. When the vehicle body speed V0 depends on the target speed TDV of the crawl control, the brake ECU 50 sets the braking-reference speed TBVad to a speed slightly higher than the target speed TDV (for example, when the target speed TDV is V11, the braking-reference speed TBVad=V12 (V12>V11) is set). After the vehicle body speed V0=0 (it is determined that the vehicle 1 is stopped), the brake pedal 13 is released, the control unit 205 of the brake ECU 50 performs control to gradually decrease the braking-reference speed TBVad to "0".

In the example shown in FIG. 4(1), after the driver releases the brake pedal 13 at time t13, the control unit 205 performs control for increasing the driving force to achieve the target speed TDV according to the crawl control (the target force TDF in FIG. 4(2) is defined as a driving force set as a target by the control unit 205). In this manner, as shown in FIG. 4(1), the vehicle 1 starts to travel at time t15. When the vehicle 1 starts to travel and the vehicle body speed V0 starts to increase, the brake ECU 50 performs control for increasing the braking-reference speed TBVad.

For a period from time t15 to time t16, since the vehicle body speed V0 is higher than the braking-reference speed TBVad, as shown in FIG. 4(5), the control unit 205 performs control for increasing a target braking force TBF to supply braking force. The target braking force TBF is defined as a value which is set as a target to supply braking force to the wheels FR, FL, RR, and RL such that the brake ECU 50 controls the brake actuator 15.

In this manner, the brake actuator 15 supplies the braking force B0 to cause the braking force B0 follows the target braking force TBF. After time t16, since the vehicle body speed V0 becomes lower than the braking-reference speed TBVad, the control unit 205 performs control for reducing the target braking force TBF. In this manner, the braking force B0 to be supplied by the brake actuator 15 decreases.

FIG. 4(2) shows driving force or the like. In (2), the driving force is expressed by an inclination resistance force Fslope generated by an inclination of a road surface. The positive inclination resistance force Fslope represents an uphill slope, and the negative inclination resistance force Fslope represents a downhill slope.

FIG. 4(2) shows the force as an acceleration resistance force Fgx generated by the acceleration of the vehicle 1. The acceleration resistance force Fgx becomes a negative value while braking control of the vehicle 1 is performed for a period from time t11 to t12. Furthermore, the acceleration resistance force Fgx, after time t15, sharply increases because the vehicle 1 starts to travel. However, the acceleration resistance force Fgx gradually decreases because the braking force B0 is supplied as shown in FIG. 4(5).

FIG. 4(2) also shows the resistance force as a travel resistance force Freg generated between the wheels FR, FL, RR, and RL of the vehicle 1 and the load surface on which the wheels FR, FL, RR, and RL are grounded. In the example shown in FIG. 4(2), since the road surface is a desert or the like, the travel resistance force Freg is a value F11 or more.

As shown in FIG. 4(2), after the brake pedal is released at time t13, according to a designation based on crawl control and transmitted from the communication unit 201 of the brake ECU 50, the engine ECU 10 performs control for increasing a target driving force TDF from time t13 (at which the brake pedal 13 is released). The target driving force TDF is defined as a driving force set as a target by the engine ECU 10 to drive the engine 11. It is assumed that the driving force actually output by the engine 11 is almost equal to the target driving force TDF.

The increase of the target driving force TDF allows the driving force to be transmitted to the wheels FR, FL, RR, and RL, and the travel resistance force Freg also increases from time t14. After the vehicle 1 starts to travel at time t15, the travel resistance force Freg gradually decreases toward a value F11.

In the embodiment, after time t15, as shown in (1), the vehicle body speed V0 exceeds the braking-reference speed TBVad serving as a reference to supply braking force. For this reason, the control unit 205 raises the target braking force TBF, the communication unit 201 designates the engine ECU 10 to control the target driving force TDF such that the target driving force TDF is smaller than a driving force Ffb (to also be referred to as a feedback driving force Ffb hereinafter) obtained by feedback performed by a conventional speed deviation. The feedback driving force Ffb according to the embodiment is defined as a driving force adjusted from a previous feedback driving force Ffb on the basis of a difference between a target speed and an actual speed, a difference between a target acceleration and an actual acceleration, and the like.

In the brake ECU 50 according to the embodiment, the determination unit 204 determines whether a road surface has a step on the basis of a difference between the travel resistance force and the reference value (FIG. 4(4)) and differential value of travel resistance (FIG. 4(3)). In the examples shown in FIGS. 4(1) to 4(5), as the reference value to calculate the difference of the travel resistances, a travel resistance force (reference value 401) obtained at time t14 is set. For a period from time t14 to t16, a difference between the travel resistance force Freg and the reference value 401 is calculated, and it is determined on the basis of the difference whether the road surface has a step.

Thereafter, as the reference value to calculate the difference of the travel resistances, a travel resistance force (reference value 402) obtained at time t16 is set. After time t16, a difference between the travel resistance force Freg and the reference value 402 is calculated, and it is determined on the basis of the difference whether the road surface has a step. In the embodiment, within a predetermined period, a minimum travel resistance force is set as a reference value. However, the reference value need only be a value to be compared with the travel resistance force, and the minimum travel resistance force need not be set as the reference value.

FIG. 4(3) shows a differential value DRF of travel resistance force. The determination unit 204 according to the embodiment determines whether the differential value DRF of travel resistance force exceeds a threshold value KDR. In the example shown in FIG. 4(3), within a period from time t14 to time t15, it can be confirmed that the differential value DRF of travel resistance force exceeds the threshold value KDR.

FIG. 4(4) shows a difference (to also be referred to as a travel resistance difference hereinafter) between the travel resistance force and the reference value. In the embodiment, the determination unit 204 subtracts the set reference value (for example, the reference value 401 or 402) from the calculated travel resistance force to calculate a travel resistance difference Fdiff. The determination unit 204 determines whether travel resistance difference Fdiff exceeds a threshold value Kdiff. In the example shown in FIG. 4(4), it can be confirmed that there is no period in which the travel resistance difference Fdiff exceeds the threshold value Kdiff.

In the embodiment, when the travel resistance difference Fdiff exceeds the threshold value Kdiff when the differential value DRF exceeds the threshold value KDR, the determination unit 204 determines that a step is present. In the examples shown in FIGS. 4(1) to 4(5), there is no period in which the travel resistance difference Fdiff exceeds the threshold value Kdiff, the determination unit 204 determines that a step is not present, and the control unit 205 does not perform the supply of preliminary braking force which is performed in the presence of a step.

FIGS. 5(1) to 5(5) are graphs illustrating timings of control performed while the vehicle 1 travels. In the examples shown in FIGS. 5(1) to 5(5), it is assumed that crawl control has been executed. In FIG. 5(1), as in FIG. 4(1), the target speed TDV of crawl control, the vehicle body speed V0 of the vehicle 1, and the braking-reference speed TBVad are defined.

As shown in FIG. 5(1), the vehicle body speed V0 begins to decrease at time t21, and the vehicle body speed V0="0" is satisfied at time t22.

In FIG. 5(5), as in FIG. 4(5), the braking force B0 applied to the vehicle 1, the target braking force TBF, and a feedback braking force Bfb are defined. The feedback braking force Bfb is defined as a braking force adjusted from a previous feedback braking force Bfb on the basis of a difference between a target speed and an actual speed, a difference between a target acceleration and an actual acceleration, and the like.

As shown in FIG. 5(5), within a period from time t21 to time t22 in which the vehicle body speed V0 decreases, since the braking force B0 does not rise, the stop of the vehicle body 1 is not based on working of the brake pedal 13 by the driver.

As shown in FIG. 5(1), when the vehicle body speed V0 decreases, when it is determined that the vehicle 1 stops and that the driver does not work the brake pedal 13, the control unit 205 of the brake ECU 50 performs control for reducing the braking-reference speed TBVad.

In FIG. 5(2), as in FIG. 4(2), the inclination resistance force Fslope, the acceleration resistance force Fgx, the travel resistance force Freg, the target driving force TDF, and the feedback driving force Ffb are defined. As shown in FIG. 5(2), almost at time t22 at which the vehicle body speed V0 becomes "0" the communication unit 201 of the brake ECU 50 requests the engine ECU 10 to raise the driving force to achieve a speed set in crawl control. In this manner, after time t22, the engine ECU 10 raises the target driving force TDF. With the raise of the target driving force TDF, the travel resistance force Freg also rises.

FIG. 5(3) shows a differential value DRF of travel resistance force. The determination unit 204 according to the embodiment determines whether the differential value DRF of travel resistance force exceeds a threshold value KDR. In the example shown in FIG. 5(3), within a period from time t22 to time t24, it can be confirmed that the differential value DRF of travel resistance force exceeds the threshold value KDR.

FIG. 5(4) shows the travel resistance difference Fdiff between the travel resistance force and the reference value. In the embodiment, the determination unit 204 subtracts the set reference value (for example, the reference value 501, 502, or 503) from the calculated travel resistance force to calculate the travel resistance difference Fdiff. The determination unit 204 determines whether the travel resistance difference Fdiff exceeds the threshold value Kdiff. In the example shown in FIG. 5(4), it can be confirmed that the travel resistance difference Fdiff exceeds the threshold value Kdiff for a period from time t23 to time t25.

Thus, the determination unit 204 according to the embodiment determines that a step is present because, for a period from time t23 to time t24, the differential value DRF of travel resistance force exceeds the threshold value KDR and the travel resistance difference Fdiff exceeds the threshold value Kdiff. As shown in FIG. 5(5), the control unit 205, for a period from time t23 to time t24, performs control for supplying preliminary braking force on the basis of the preliminary braking force map storage unit 206.

In the example shown in FIG. 5(1), at time t24, the vehicle body speed V0>braking-reference speed TBVad is satisfied.

Since it is determined that a step is present until time t24, the control unit 205 according to the embodiment, when vehicle body speed V0>braking reference speed TBVad is satisfied, determines that the vehicle runs over the step, the communication unit 201 instructs the engine ECU 10 to reduce the torque of the engine 11, and the control unit 205 performs control for supplying braking force to the wheels FR, FL, RR, and RL.

As shown in FIG. 5(5), the control unit 205, when the vehicle body speed V0>the braking-reference speed TBVad, sets a maximum value which can be set as a braking force for the wheels FR, FL, RR, and RL to the target braking force TBF. In this manner, the control unit 205 designates the brake actuator 15 to supply braking force at the maximum value. In this manner, the braking force B0 rises toward the target braking force TBF serving as a target. Thus, the embodiment can improve braking response. In the embodiment, a method of setting the target braking force TBF is not limited to the method of setting a maximum value. For example, the braking force TBF may be set to follow the feedback braking force Bfb.

However, when a difference between the feedback braking force Bfb and the braking force B0 is large, a jumping-out feeling may be given to the driver while the vehicle 1 travels. Thus, the engine ECU 10 according to the embodiment, according to a designation from the communication unit 201 of the brake ECU 50, adjusts the feedback driving force Ffb such that the feedback driving force Ffb is reduced in driving force by a difference between the feedback braking force Bfb and the actual braking force B0.

In the examples shown in FIGS. 5(1) to 5(5), for a period from time t24 to time t25, the adjustment to reduce the feedback driving force Ffb in driving force by the difference between the feedback braking force Bfb and the actual braking force B0. However, the adjusting method need not be always used, adjustment to reduce the driving force on the basis of a difference between a vehicle body acceleration and a braking reference acceleration may be performed.

In the embodiment, it is assumed that adjustment to reduce the feedback driving force Ffb in driving force by a larger one of an amount of adjustment based on the difference between the feedback braking force Bfb and the actual braking force B0 and an amount of adjustment based on the difference between the vehicle body acceleration and the braking reference acceleration.

In the examples shown in FIGS. 5(1) to 5(5), since "the amount of adjustment based on the feedback braking force Bfb and the actual braking force B0">"the amount of adjustment based on the vehicle body acceleration and the braking reference acceleration" is satisfied, it is assumed that the driving force control represented in the period from time t24 to time t25 in FIG. 5(2) is performed. In this manner, the control for reducing driving force is performed on the basis of a larger one of the amounts of adjustment to make it possible to suppress the jumping-out feeling of the vehicle 1. Thus, speed/acceleration control suitable for situations of the vehicle 1 can be achieved.

In the embodiment, when the processing described above is performed, on the basis of a difference between a travel resistance force and a reference value and a change in travel resistance force, it is determined whether a road surface has a step, so that detection accuracy of a road surface condition can be improved.

Braking control in the vehicle 1 according to the embodiment will be described below. FIGS. 6A, 6B, and 7A-7C are flow charts showing procedures of the above-mentioned control in the vehicle 1 according to the embodiment.

The inputting process unit 202 performs inputting process of various pieces of information related to the vehicle 1 from sensors and the like (step S601). As the pieces of information subjected to the inputting process, for example, wheel speeds of the wheels detected by the wheel speed sensors 20FL, 20FR, 20RL, and 20RR, respectively, an acceleration detected by the acceleration sensor 25, a torque force of the engine 11, a gear ratio of the main transmission 2a, a gear ratio of the sub-transmission 2b, a torque ratio of the transmission 2, transmitting efficiency of the transmission 2, a brake pressure obtained by the brake pedal 13 and detected by the M/C pressure sensor 22, a gear position (H4, L4) of the sub-transmission 2b, an operation status of the CRAWL switch 23, a speed set by the target speed setting switch 24, and the like are used.

The inputting process unit 202 determines whether, of the pieces of information subjected to the inputting process, the gear position of the sub-transmission 2b=L4 and the CRAWL switch 23=ON are satisfied (step S602). When the inputting process unit 202 determines that the gear position of the sub-transmission 2b≠L4 or the CRAWL switch 23≠ON (step S602: No), the inputting process unit 202 ends the process on the assumption that normal control is performed without performing the crawl control.

On the other hand, when the inputting process unit 202 determines that the gear position of the sub-transmission 2b=L4 and the CRAWL switch 23=ON (step S602: Yes), the inputting process unit 202 starts the crawl control and calculates a vehicle body speed and a vehicle body acceleration on the basis of the wheel speeds of the respective wheels detected by the wheel speed sensors 20FL, 20FR, 20RL, and 20RR (step S603). In the embodiment, after the vehicle body speed is calculated on the basis of the wheel speeds of the respective wheels, a vehicle body acceleration is calculated on the basis of the currently calculated vehicle body speed, the previously calculated vehicle body speed, and a calculation cycle of the vehicle body speeds.

The inputting process unit 202, on the basis of the speed set with the target speed setting switch 24, calculates a target speed for driving and a target acceleration for driving (step S604). When the speed set with the target speed setting switch 24 is switched, a filter is activated to set the target speed such that the target speed gradually changes from a speed obtained before the setting to a speed obtained after the setting. In the embodiment, after the target speed is calculated, a target acceleration is calculated on the basis of the currently calculated target speed, the previously calculated target speed, and a calculation cycle of the target speeds.

The inputting process unit 202 determines whether the vehicle body speed V0=0, the previous feedback braking force=0, and the brake pressure obtained by the brake pedal 13=0 are satisfied (in other words, the brake pedal 13 is not worked) (step S605). When the inputting process unit 202 determines that the vehicle body speed V0=0, the previous feedback braking force=0, and the brake pressure obtained by the brake pedal 13=0 are satisfied (step S605: Yes), the inputting process unit 202 calculates a braking reference speed (step S606). In step S606, the inputting process unit 202 sets, as a current braking reference speed, a larger value of a value obtained by subtracting a first predetermined value Kdw from a previously calculated braking reference speed and "0" (braking reference speed=MAX (previous braking reference speed−Kdw, 0). The first predetermined value Kdw is defined as a constant set depending on embodiments.

On the other hand, when the inputting process unit 202 determines that the vehicle body speed V0≠0, the previous feedback braking force≠0, and the brake pressure obtained by the brake pedal 13≠0 are satisfied (step S605: No), the inputting process unit 202 calculates a braking reference speed by a method different from that in step S606 (step S607). In step S607, the inputting process unit 202 sets a smaller value of a value obtained by adding a second predetermined value Kup to the previously calculated braking reference speed and a maximum braking reference speed TBVmax as a current braking reference speed (braking reference speed=MIN (previous braking reference speed−Kup, TBVmax)). The maximum braking reference speed TBVmax is a speed corresponding to a target speed of crawl control and means a maximum speed set as a threshold value (reference) for applying braking force to maintain the target speed. The second predetermined value Kup is defined as a constant set depending on embodiments.

The inputting process unit 202 calculates a braking reference acceleration from the braking reference speed (step S608). In the embodiment, the braking reference acceleration is calculated on the basis of the currently calculated braking reference speed, the previously calculated braking reference speed, and a calculation cycle of the braking reference speeds.

The inputting process unit 202 calculates an inclination of a road surface on which the vehicle 1 travels and an inclination force (step S609). The inputting process unit 202 according to the embodiment, the inputting process unit 202 subtracts the vehicle body acceleration calculated in step S603 from the acceleration detected by the acceleration sensor 25 to calculate an acceleration of inclination. Furthermore, the inputting process unit 202 multiplies the acceleration of inclination by a vehicle body weight to calculate an inclination force.

In addition, the inputting process unit 202 calculates a driving force, a braking force, and an actual acceleration force output from the vehicle 1 at present (step S610). The inputting process unit 202 according to the embodiment multiplies the torque of the engine 11 by the gear ratio of the main transmission 2a, the gear ratio of the sub-transmission 2b, the torque ratio of the transmission 2, the transmitting efficiency of the transmission 2, and the final gear ratio and divides the resultant value by a tire diameter so as to calculate driving forces transmitted to the wheels FR, FL, RR, and RL. The inputting process unit 202 according to the embodiment multiplies a wheel pressure, a cylinder area, a rotor effective diameter, and a brake factor by each other and divides the resultant value by the tire diameter so as to calculate respective braking forces of the wheels FR, FL, RR, and RL. The inputting process unit 202 adds the braking forces of all the four respective wheels to each other to calculate a braking force of the vehicle body. Furthermore, the inputting process unit 202 multiplies the acceleration of the vehicle body by the vehicle body weight to calculate an actual acceleration force. Parameters used in these calculations are parameters subjected to an inputting process in step S601 and parameters stored in a ROM (not shown) in advance.

The acquisition unit 203 determines whether the vehicle body speed V0 is "0" (step S611). When the acquisition unit 203 determines that the vehicle body speed V0 is "0" (step S611: Yes), the acquisition unit 203 calculates travel resistance forces generated between the wheels FR, FL, RR, and RL and the road surface (step S612). As a calculating method used in the acquisition unit 203, a larger value of a value obtained by subtracting the actual acceleration force and the braking force from a currently output driving force and a previous travel resistance force is defined as a travel resistance force (current travel resistance force=MAX ((driving force−actual acceleration force−braking force), previous travel resistance force). In the calculation of the travel resistance force, a filtering process may be performed to suppress a fluctuation margin from being widened.

On the other hand, when it is determined that the vehicle body speed V0 is not "0" (step S611: No), the acquisition unit 203 calculates a travel resistance force (step S613). As a calculating method used in the acquisition unit 203, a larger value of a value obtained by subtracting the actual acceleration force and the braking force from a driving force and "0" is defined as a travel resistance force (current travel resistance force=MAX ((driving force−actual acceleration−braking force), 0). In the calculation of the travel resistance force, a filtering process may be performed to suppress a fluctuation margin from being widened.

The acquisition unit 203 performs a setting process of a reference value of travel resistance force (step S614). A concrete method for a reference value setting process will be described later.

The acquisition unit 203 calculates a differential value of travel resistance force (step S615). In the embodiment, the differential value of travel resistance force is calculated on the basis of the currently calculated travel resistance force, the previously calculated travel resistance force, and a calculation cycle of travel resistance forces.

The acquisition unit 203 calculates a travel resistance difference serving as a difference between the travel resistance force and the reference value (step S616).

The determination unit 204 determines whether (differential value of travel resistance force>threshold value for differential KDR) and (travel resistance difference>threshold for difference Kdiff) are satisfied (step S617). The determination of differential value of travel resistance force>threshold value for differential KDR is performed to make it possible to prevent a situation in which a road surface gradually changes into a road surface such as a desert having high travel resistance force from being erroneously determined as a step. The determination of travel resistance difference>threshold value for difference Kdiff is performed to make it possible to prevent a situation in which the vehicle starts on a road surface such as a desert having high travel resistance force from being erroneously determined as a step. As the threshold value for differential KDR or the threshold value for difference Kdiff, an appropriate value is set depending on embodiments.

When the determination unit 204 determines that at least one of differential value of travel resistance force>threshold value for differential KDR and travel resistance difference>threshold value for difference Kdiff is not satisfied (step S617: No), the control unit 205 sets preliminary braking force=0 (step S618). In other words, when at least one of differential value of travel resistance force>threshold value for differential KDR, and a travel resistance difference>threshold value Kdiff for difference is not satisfied, the road surface is regarded as a step, and the process is performed on the assumption that preliminary braking need not be performed.

On the other hand, the determination unit 204 determines that both (differential value of travel resistance force>threshold value for differential KDR) and (travel resistance difference>threshold value Kdiff for difference) are satisfied (step S617: Yes), the control unit 205, on the basis of the preliminary braking force map storage unit 206, calculates a preliminary braking force corresponding to the travel resistance difference (step S619).

The control unit 205 determines whether both previous vehicle body speed braking reference speed TBVad and current vehicle body speed>braking reference speed TBVad are satisfied (step S620). For example, the vehicle 1 starts to travel for a period from previous time to this time, both previous vehicle body speed braking reference speed TBVad and current vehicle body speed>braking reference speed TBVad are satisfied.

When the control unit 205 determines that at least one of previous vehicle body speed braking reference speed TBVad and current vehicle body speed>braking reference speed TBVad is not satisfied (step S620: No), the control unit (step S620: No), the control unit 205 shifts to step S623.

On the other hand, the control unit 205 determines that both previous vehicle body speed braking reference speed TBVad and current vehicle body speed>braking reference speed TBVad are satisfied (step S620: Yes), a larger one of the travel resistance difference and the previous feedback braking force is set as a feedback braking force (step S621). Furthermore, the control unit 205 sets first flag=ON and second flag=ON (step S622). The first flag is defined as a flag to set a braking force, and the second flag is defined as a flag to set a driving force of the engine 11.

The control unit 205 determines whether all first flag=ON, braking force<previous feedback braking force, and vehicle body acceleration>braking reference acceleration are satisfied (step S623). When the control unit 205 determines that all first flag=ON, braking force<previous feedback braking force, and vehicle body acceleration>braking reference acceleration are satisfied (step S623), a maximum value which can be set as a braking force is set as a preliminary braking force (step S624), the control unit 205 shifts to step S628. In step S624, since the condition given by first flag=ON is satisfied, as parameter species to set an actual braking force after the vehicle 1 starts to travel, the preliminary braking force is used.

On the other hand, when the control unit 205 determines that at least one of first flag=ON, braking force<previous feedback braking force, and vehicle body acceleration>braking reference acceleration is not satisfied (step S623: No), the control unit 205 determines whether first flag=ON (step S625). When the control unit 205 determines that first flag≠ON (step S625: No), the control unit 205 shifts to step S628 on the assumption that start or the like of driving of the vehicle 1 is not performed at present.

On the other hand, when the control unit 205 determines that first flag=ON (step S625: Yes), a smaller value (MIN (previous feedback braking force, vehicle body braking force)) of the previous feedback braking force and the braking force of the vehicle body is set as a current (temporary) feedback braking force (step S626). The previous feedback braking force is defined as a value previously calculated in step S633. The control unit 205 sets first flag=OFF (step S627).

The control unit 205 determines whether second flag=ON (step S628). When the control unit 205 determines that second flag≠ON (step S628: No), the control unit 205 sets first adjustment driving force=0 (step S630) to shift to step S633.

On the other hand, when the control unit 205 determines that second flag=ON (step S628: Yes), first adjustment driving force=MAX (MIN ((driving force−inclination force), (vehicle body acceleration−braking reference acceleration)×vehicle body weight), and previous first adjustment driving force−third predetermined value Kdw2, 0) is set (step S629). The adjustment driving force is defined as a parameter used when a target driving force is calculated by adjusting a feedback driving force. The third predetermined value Kdw2 is defined as a constant set depending on embodiments.

Furthermore, the control unit 205 determines whether first adjustment driving force=0 (step S631). When the control unit 205 determines that first adjustment driving force≠0 (step S631: No), the control unit 205 shifts to step S633. On the other hand, when the control unit 205 determines that first adjustment driving force=0 (step S631: Yes), the control unit 205 sets second flag=OFF (step S632) to shift to step S633.

The control unit 205 calculates a feedback braking force (step S633). In the embodiment, the control unit 205 calculates the feedback braking force from MAX (((temporary) feedback braking force calculated in step S626 or (if not be calculated in step S626) previous feedback braking force+(vehicle body speed−braking reference speed)×fourth predetermined value+(vehicle body acceleration−braking reference acceleration)×fifth predetermined value), 0). In this manner, the feedback braking force is defined as a value obtained by adjusting the (temporary) feedback control force or the previous feedback control force on the basis of the vehicle body speed and the vehicle body acceleration. The fourth predetermined value and the fifth predetermined value are defined as constants set depending on embodiments. In the embodiment, although a feedback braking force is calculated on the basis of the vehicle body speed and the vehicle body acceleration, both the vehicle body speed and the vehicle body acceleration need not be always used, but any one of the vehicle body speed and the vehicle body acceleration may be used.

Furthermore, the control unit 205 calculates a target braking force from MAX (feedback braking force, preliminary braking force) (step S634). When the vehicle 1 starts to travel to satisfy the condition in step S623, a maximum value (larger than the feedback braking force) as obtained in the period from time t24 to time t25 in FIG. 5(5) is set as a target braking force in step S634.

The control unit 205 calculates a feedback driving force (step S635). In the embodiment, the control unit 205 calculates the feedback driving force from MAX (previous feedback driving force+(vehicle body speed−braking reference speed)×sixth predetermined value+(vehicle body acceleration−braking reference acceleration)×seventh predetermined value), 0). The sixth predetermined value and the seventh predetermined value are set depending on embodiments. In the embodiment, the feedback driving force is defined as a value obtained by adjusting the previous feedback driving force on the basis of the vehicle body speed and the vehicle body acceleration.

The control unit 205 sets second adjustment driving force=MAX (MIN (feedback braking force−vehicle body braking force), (feedback driving force−inclination force)), 0) (step S636).

The control unit 205 calculates a target driving force from feedback driving force−MAX (first adjustment driving force, second adjustment driving force) (step S637). In the embodiment, although the feedback driving force is calculated by the process in step S635, the feedback driving force can achieve only a small adjustment width when the driving force must be sharply varied as in a case in which the vehicle runs on a step. Thus, in step S637, the feedback driving force is adjusted on the basis of the first adjustment driving force or the second adjustment driving force.

The first adjustment driving force is an adjustment value for driving force calculated not to give a jumping-out feeling to the driver on the basis of the vehicle body acceleration and the braking reference acceleration when it is determined (in step S620) that the vehicle runs over a step. On the other hand, the second adjustment driving force is an adjustment value based on the feedback braking force calculated on the basis of the speed and the acceleration of the vehicle and an actually output braking force, and is an adjustment value to reduce the torque of the engine 11 by a force corresponding to time-lag of application of the braking force. In step S637, it is assumed that a larger one of the first adjustment driving force and the second adjustment driving force is subtracted from the feedback driving force to calculate a target driving force. In this manner, since the driving force of the vehicle 1 is suppressed, a jumping-out feeling can be suppressed from being given to the driver when the vehicle runs over a step, and acceleration can be suppressed from being generated even though braking is delayed.

A setting process of the reference value of travel resistance force shown in step S614 in FIGS. 6A and 6B in the vehicle 1 according to the embodiment will be described below. FIGS. 8A and 8B are a flow chart showing a procedure of the above-mentioned process in the vehicle 1 according to the embodiment. The initial value of the counter is set to 0.

The acquisition unit 203 determines whether current travel resistance force>previous travel resistance force (step S801). When the acquisition unit 203 determines that current travel resistance force>previous travel resistance force is satisfied (step S801: Yes), "1" is added to the counter (step S802).

The acquisition unit 203 determines whether counter=1 (step S803). The acquisition unit 203 ends the process when determines that counter≠1 (step S803: No).

On the other hand, when the acquisition unit 203 determines that counter=1 (step S803: Yes), the acquisition unit 203 sets the previous travel resistance force as a reference value of travel resistance force (step S804) to end the process.

In step S801, when the acquisition unit 203 determines that current travel resistance force>previous travel resistance force is not satisfied (step S801: No), the acquisition unit 203 determines whether current travel resistance force<previous travel resistance force is satisfied (step S805). When the acquisition unit 203 determines that current travel resistance force<previous travel resistance force is not satisfied (step S805: No), the acquisition unit 203 ends the process.

On the other hand, when the acquisition unit 203 determines that current travel resistance force<previous travel resistance force is satisfied (step S805: Yes), the acquisition unit 203 initializes the counter to "0" (step S806) to end the process.

In the embodiment, according to the process shown in FIGS. 8A and 8B, it is assumed that a reference value of travel resistance force is set. In this manner, the acquisition unit 203, in a state in which the travel resistance force decreases or does not change, sets as a reference value a travel resistance force acquired at a timing at which the travel resistance force rises before the travel resistance force rises. In this manner, as the reference value, a minimum value of travel resistance force in an arbitrary period of time is set. In this manner, comparison with a subsequent travel resistance force can be easily performed. The embodiment describes the example in which a minimum value of travel resistance force in an arbitrary period of time is set as a reference value by the procedure described above. However, the reference value is not limited to the minimum value, and may be a value serving as a reference in comparison between travel resistance forces.

The brake ECU 50 according to the embodiment is designed such that a step determination of a road surface is performed on the basis of a travel resistance force and a change in travel resistance force. In this manner, even on a road surface state such as a desert, step detection accuracy can be improved. When the step detection accuracy is improved, preliminary braking force can be suppressed from being applied in a situation such as a desert in which the vehicle does not run on a step. In this manner, efficient driving control and efficient braking control can be achieved. In this manner, in the embodiment, speed control of a vehicle depending on road surface situations can be achieved.

In the brake ECU 50 according to the embodiment, preliminary braking force is supplied when it is determined that a step is present so as to make it possible to supply braking force immediately after the vehicle runs over the step. Thus, a jumping-out feeling of the vehicle 1 can be suppressed from being given to the driver. In this manner, a comfortable ride can be provided to the driver. Since acceleration occurring after the vehicle 1 runs over a step can be suppressed, safety can be improved. Furthermore, preliminary braking force is suppressed from being supplied in a case except for a case in which a step is present to make it possible to suppress a gas mileage from decreasing.

The several embodiments of the present invention have been described above. However, the embodiments are presented as examples, and do not intend to limit the scope of the invention. The new embodiments can be executed in other various configurations, and various omissions, replacements, and changes of the invention can be performed without departing from the scope of the invention. The embodiments and modifications thereof are included in the scope and the subject-matter of the invention and included in the invention described in the scope of claims and a scope equivalent thereto.

The invention claimed is:

1. A vehicle brake device comprising:
an acquisition unit that acquires, when a vehicle having a wheel travels, on the basis of driving force of the vehicle and acceleration of the vehicle, travel resistance force produced between the wheel of the vehicle and a road surface touched by the wheel; and
a control unit that starts a control for supplying braking force to the wheel of the vehicle when a difference between the travel resistance force and a predetermined value exceeds a first threshold value and a differential value of the travel resistance force exceeds a second threshold value, wherein
the acquisition unit further acquires a speed of the vehicle,
the control unit supplies, after control for supplying braking force to the wheel because the difference between the travel resistance force and the predetermined value exceeds the first threshold value and the differential value of the travel resistance force exceeds the second threshold value, i.e., preliminary braking control which is not enough to hinder the vehicle from traveling is started, when the speed of the vehicle exceeds a first speed, a braking force larger than that in the preliminary braking to the wheel, and
the control unit further reduces, when the speed of the vehicle exceeds the first speed, a driving force of the wheel by an amount of adjustment based on a difference between a braking force calculated depending on the speed and an acceleration of the vehicle and an actually output braking force.

2. A vehicle brake device comprising:
an acquisition unit that acquires, when a vehicle having a wheel travels, on the basis of driving force of the vehicle and acceleration of the vehicle, travel resistance force produced between the wheel of the vehicle and a road surface touched by the wheel; and
a control unit that starts a control for supplying braking force to the wheel of the vehicle when a difference between the travel resistance force and a predetermined value exceeds a first threshold value and a differential value of the travel resistance force exceeds a second threshold value, wherein
the acquisition unit further acquires a speed of the vehicle,
the control unit supplies, after control for supplying braking force to the wheel because the difference between the travel resistance force and the predetermined value exceeds the first threshold value and the differential value of the travel resistance force exceeds the second threshold value, i.e., preliminary braking control which is not enough to hinder the vehicle from traveling is started, when the speed of the vehicle exceeds a first speed, a braking force lamer than that in the preliminary braking to the wheel, and
the control unit further reduces, when the speed of the vehicle exceeds the first speed, a driving force of the wheel by a larger value of an amount of adjustment based on a difference between a braking force calculated depending on the speed and an acceleration of the vehicle and an actually output braking force and an amount of adjustment based on the acceleration of the vehicle.

3. The vehicle brake device according to claim 1, wherein the control unit sets a minimum value of the travel resistance force acquired by the acquisition unit in an arbitrary period of time as the predetermined value.

4. The vehicle brake device according to claim 2, wherein the control unit sets a minimum value of the travel resistance force acquired by the acquisition unit in an arbitrary period of time as the predetermined value.

5. The vehicle brake device according to claim 1, wherein the control unit further performs control for reducing the first speed serving as a reference for supplying braking force when the vehicle stops and the driver do not perform braking control of the vehicle.

6. The vehicle brake device according to claim 2, wherein the control unit further performs control for reducing the first speed serving as a reference for supplying braking force when the vehicle stops and the driver do not perform braking control of the vehicle.

7. The vehicle brake device according to claim 3, wherein the control unit further performs control for reducing the first speed serving as a reference for supplying braking force when the vehicle stops and the driver do not perform braking control of the vehicle.

8. The vehicle brake device according to claim 4, wherein the control unit further performs control for reducing the first speed serving as a reference for supplying braking force when the vehicle stops and the driver do not perform braking control of the vehicle.

* * * * *